A. Holdredge, B.F. & H.H. Harrington,
Cheese Hoop.
No. 112,597. Patented Mar. 14, 1871.

Witnesses:
A. Bennewendorf.
Wm. H. C. Smith.

Inventor:
A. Holdredge.
B. F. Harrington.
H. H. Harrington.
per Munn & Co.
Attorneys.

UNITED STATES PATENT OFFICE.

ARTEMAS HOLDREDGE, OF WEST BURLINGTON, AND BENJAMIN F. HARRINGTON AND HENRY H. HARRINGTON, OF NEW BERLIN, N. Y.

IMPROVEMENT IN CHEESE-HOOPS.

Specification forming part of Letters Patent No. 112,597, dated March 14, 1871.

*To all whom it may concern:*

Be it known that we, ARTEMAS HOLDREDGE, of West Burlington, in the county of Otsego, and BENJAMIN F. HARRINGTON and HENRY H. HARRINGTON, of New Berlin, in the county of Chenango and State of New York, have invented a new and Improved Cheese-Hoop; and we do hereby declare that the following is a full, clear, and exact description thereof, which will enable others skilled in the art to make and use the same, reference being had to the accompanying drawing, forming part of this specification.

This invention relates to improvements in hoops or pressing-cases, to be used in the manufacture of cheese in rectangular form; and it consists in a four-sided case in two or more horizontal sections, having the sides jointed together at two or more of the corners, and detachably connected at one or both the other corners for opening to release the cheese after being pressed, each section being provided with locking-cleats adapted for controlling the position of the superposed sections, all as hereinafter described.

Figure 1:
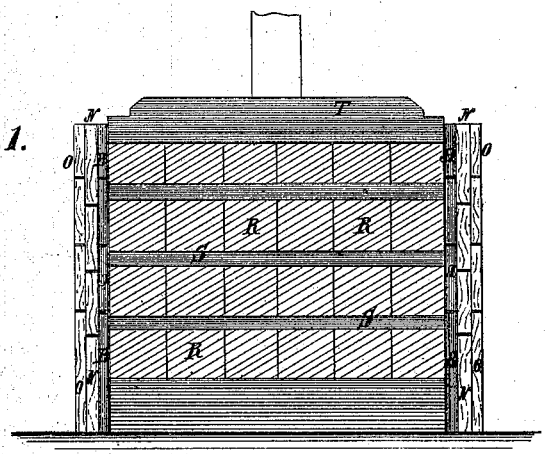
Figure 2:
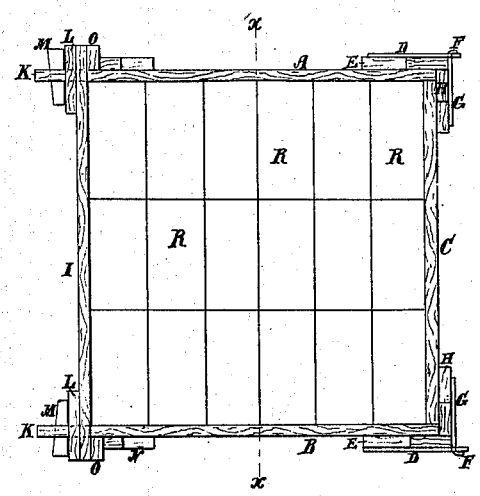
Figure 3:
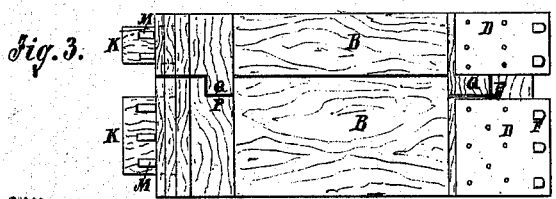

Figure 1 is a sectional elevation of our improved cheese-hoop or pressing-case. Fig. 2 is a top view, and Fig. 3 is a side elevation, of the same.

Similar letters of reference indicate corresponding parts.

The two side boards A and B of each horizontal section of the case are, in this example, connected to the side C by means of the slotted plates D, attached to the cleats E near one end, the said plates projecting beyond the end to receive the hook-shaped projections F of the plates G, attached to cleats H on the side C, as shown; and the said sides are connected to the other side, I, by the tenons K and keys M, the said tenons passing through the side I and cleats L thereon; and the said sides B and C have cleats N, which fit against narrow cleats O, attached to the ends of the sides I, the latter cleats being employed to support the sides A and B against the lateral pressure in a way to relieve the tenons of such force to a considerable extent.

The cleats E, H, N, and L are employed for holding the sections of the case, one upon another, in the right positions, also for strengthening the side boards near the ends.

Fig. 3 shows the manner of holding the supported sections properly by these cleats. Those on one section — say, the lower one — have notches P in the upper end, and those on the upper section have notches Q, fitting thereon, as shown. This arrangement admits of readily removing the sections from the pressed cheese by detaching the keys M, removing the side I, and swinging the sides B and C away from the cheese.

It will be observed that, by connecting the side B on A C rigidly at one corner, and making the opposite corner diagonally also rigid, and the corner diagonally the one opposite, hinged together so as to open and close when swinging on the hinged corner, the same results may be obtained.

It will also be observed that any approved form of hinged joints may be substituted for the slotted plates D and the hooked plates G, and we propose to employ such other hinge.

This improved sectional case is designed for pressing rectangularly-shaped cheeses, such as indicated by the figure R, and is intended to be made in as many horizontal sections as the number of layers it is required to press at once, and so that more or less sections may be employed, according to the work in hand.

The lower section is placed on the platform of the press.

A plate or follower, S, is interposed between each layer of cheese, and the press-follower T acts upon the top plate S.

Having thus described our invention, we claim as new and desire to secure by Letters Patent—

1. A rectangular cheese-hoop composed of the parts A B and C I, secured together by the fastening devices herein shown and described, or their equivalents, substantially as specified.

2. The improved rectangular pressing-case composed of two or more horizontal sections, the sides of each being provided with cleats, and respectively with projections Q and notches P, and hinged and locked together, substantially as specified.

ARTEMAS HOLDREDGE.
BENJAMIN F. HARRINGTON.
HENRY H. HARRINGTON.

Witnesses:
A. M. AYLESWORTH,
D. HERRINGTON.